United States Patent [19]
Tackett

[11] 4,167,372
[45] Sep. 11, 1979

[54] INTEGRATED ENERGY SYSTEM

[75] Inventor: Louis E. Tackett, Grandview, Tex.

[73] Assignee: Unep 3 Energy Systems, Inc., Grandview, Tex.

[21] Appl. No.: 908,998

[22] Filed: May 24, 1978

Related U.S. Application Data

[60] Division of Ser. No. 728,064, Sep. 30, 1976, Pat. No. 4,118,637, and a continuation-in-part of Ser. No. 579,131, May 20, 1975, abandoned.

[51] Int. Cl.² ............................................. F04B 23/04
[52] U.S. Cl. ...................................... 417/62; 60/398; 417/334
[58] Field of Search ................. 417/62, 334, 335, 336; 290/44, 55; 60/398; 416/DIG. 6, 32, 169 R

[56] References Cited

U.S. PATENT DOCUMENTS

| | | | |
|---|---|---|---|
| 943,000 | 12/1909 | Busby | 60/398 |
| 1,622,662 | 3/1927 | Moses | 417/334 X |
| 2,059,356 | 11/1936 | James | 416/DIG. 6 |
| 2,107,690 | 2/1938 | Clark | 416/32 |
| 2,112,900 | 4/1938 | McColly | 416/32 |
| 2,391,486 | 12/1945 | Smith | 417/62 X |
| 2,539,862 | 1/1951 | Rushing | 417/336 X |
| 3,099,220 | 7/1963 | Butman | 417/336 |
| 3,730,643 | 5/1973 | Davison | 290/55 X |

*Primary Examiner*—William L. Freeh
*Assistant Examiner*—Edward Look
*Attorney, Agent, or Firm*—James L. Bean

[57] ABSTRACT

This invention is a multiple diverse energy source driven energy integration and multiple use-point system: which includes system air pressure compensated variable pressure and volume delivery of compressed air from multiple air compression stations which discharge and store compressed air into an included interconnecting collection storage and distribution conduit multiple module grid system; of largest needed and commercially available size pipe to keep the pressure drop to a minimum, and from which the compressed air is withdrawn at multiple points of need; when and as needed, through synchronized dual-precision-controls to turn, at optimum RPM speed regardless of varying work loads, air motor drives for operation of conventional electrical generating equipment with varying customer-use-demand output work loads. The conduit-pipe systems are arranged in interconnecting, but isolable, multiple module grids ranging in size from those needed, for example, for a small town or a large individual user of electricity to large metropolitan areas and which may ultimately be interconnected into a large regional, national, or continental system. Natural energy sources including wind, tide, wave, thermal and solar power, as well as conventional fuels, may be utilized to provide the energy required to drive compressors to supply the air into the system. An improved wind turbine is included for the recovery and use of wind-power for compressing air on a vast scale in multiple installations.

6 Claims, 25 Drawing Figures

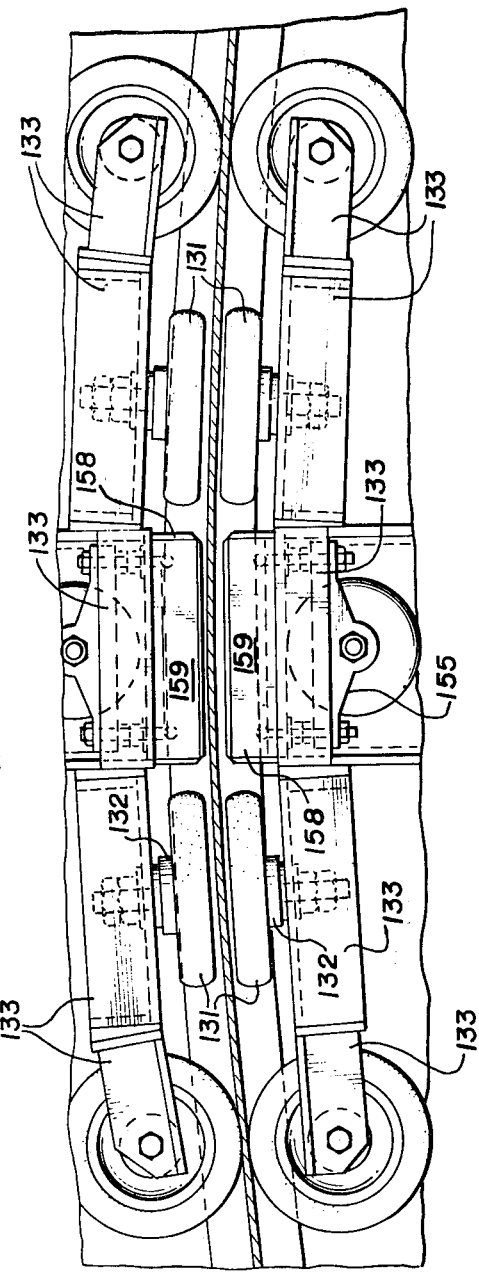
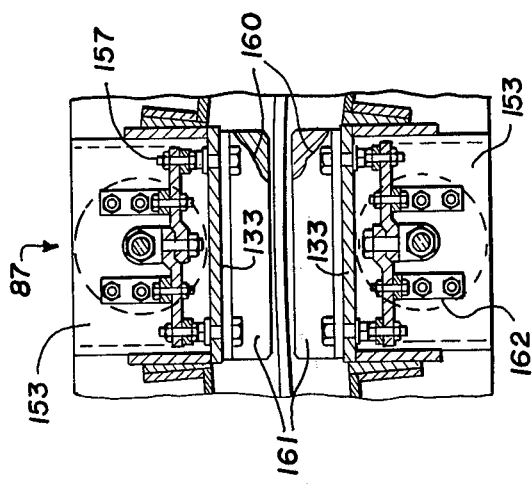

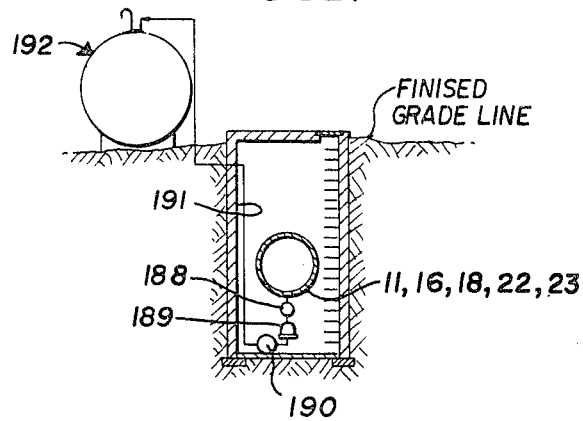
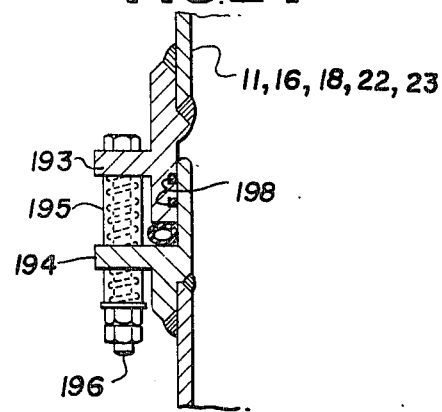
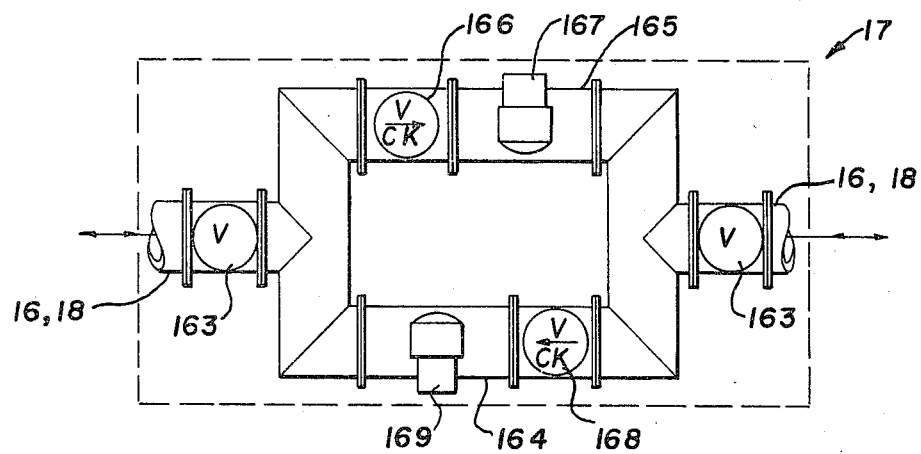
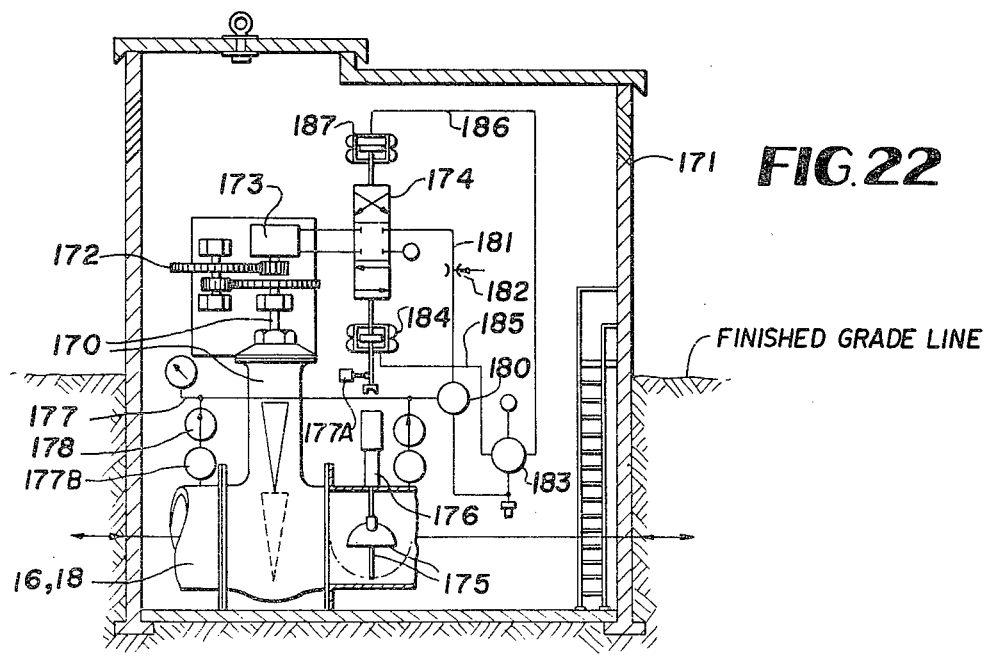

INTEGRATED ENERGY SYSTEM

CROSS REFERENCE TO RELATED APPLICATIONS

This is a division, of application Ser. No. 728,064, filed Sept. 30, 1976, now U.S. Pat. No. 4,118,637 which is a continuation-in-part of Ser. No. 579,131 now abandoned, the entire disclosure of which is incorporated herein by reference.

BACKGROUND OF THE INVENTION

1. Field of the Invention

This invention relates to systems for providing useful energy in the form of electrical power, and more particularly to an improved system for utilization of multiple diverse energy sources in compressing large volumes of air, collecting, storing and distributing the air in a conduit system including interconnecting multiple module grids constructed of large conduit-pipe, utilizing the air as and where necessary to operate equipment for generating electricity near the points of use.

2. Description of the Prior Art

The use of compressed air as a means to drive or operate numerous devices is well-known, and compressed air was widely used in the early development of modern industry. However, the development of oil and gas powered direct drive universal electrical energy generating and distribution systems have resulted in a virtual abandonment of the development of compressed air as a major industrial motive power. Consequently, air compression, storage, and transmission systems in use today generally include conventional branch and trunk type collection and transmission lines of relatively small flow size, with conventional air storage tanks, or accumulators, near the compressors and/or near the points of use. The storage tanks are expressly for the purpose of bridging over short periods of high use where compressor and normal line carrying capacities are normally overtaxed, and are not intended or built for storage of several days reserve usage of compressed air. Pressure losses in such conventional compressed air systems is a highly limiting factor in transmitting air in large volumes over any substantial distance.

The compressor installations in use today are generally single stage compressors for delivering relatively high volumes of air at low pressures, while two stages are used for medium pressures, and three stages for higher pressure, low volume air. This does not give sufficient volume-pressure automatic demand delivery flexibility in meeting maximum use demands for compressed air with minimum compressor equipment for large scale use.

Conventional compressed air controls for air motors which turn multiple electrical generators of power plants cannot adequately control the delivery of the driving air with the precision control required to reach and maintain the different optimum speeds required for different generators with varying work loads, due to the fact that such known automatic control devices generally regulate only air flow and not a combination of flow and pressure.

Electrical generating systems in use today normally make no provisions for storing energy during periods of low use for later utilization during times of peak use. This, generally, has resulted in discouraging the utilization of natural energy sources for the generation of electricity with the exception of a relatively small number of hydroelectric generating plants. Even in the case of hydroelectric plants such, for example, as that installed at the Grand Coulee Dam, it has been the general practice to directly couple large water turbines to fixed electrical generators, frequently making it necessary to duplicate or provide additional equipment in order to accomodate fluctuating demands. Under this type of development, only the very large water power sites are developed, and smaller sites are not considered economically feasible. Further, other collectively enormous sources of non-contaminating energy which have never been fully exploited due primarily to their intermittent nature: include solar energy, wind energy, and ocean tide and wave energy.

SUMMARY OF THE INVENTION

The integrated energy system according to the present invention may be constructed in any needed size, progressively and interconnectively from the size needed, for example, for a small town or a single user to that required to serve a continent. Each said system includes multiple diverse energy collector-converter-driven system pressure compensated variable volume air-compression facilities, a grid-type compressed air combination collection-storage-transmission-distribution network, preferably made of the largest commercially available conduit-pipe which may be transported over the existing highway systems; and dual precision controlled air-motor drives primarily for turning conventional electric generators. The grid conduit network preferably surrounds each area and region of use with interconnecting grid plumbing lines into which the compressed air is introduced and from which it is withdrawn where and as needed. The grid plumbing system incorporates means for automatically or manually isolating individual modules of the entire system to thereby isolate trouble spots, or areas under construction, etc.

A grid module surrounding each predetermined area or region of need is fed from multiple diverse energy source collector-converter driven air compressor stations. Such stations are placed at points throughout the area of need where constant energy output sources are available for use as well as at all other points of need where intermittent energy sources are available.

While it is contemplated that various conventional or known collector-converters of diverse forms of energy will be used to furnish mechanical torque for driving the air compressor stations, an improved wind powered energy collector-converter according to the present invention is particularly well suited for driving the air compressor units, for high capacity production of compressed air.

The grid type compressed air system allows the use of the compressed air for driving conventional electrical generators which may be located wherever needed and convenient to population centers.

The compressor stations employed to compress the air are preferably of a three stage capability, with the inlet of the second and third stages being connected so that the various compressor stations can produce high volumes of air at relatively low pressures: and by system pressure compensating automatic connecting of the inlets of the second and third stages to the discharge of the preceding stage, a lower volume of relatively high pressure air can be delivered as system air-pressure rises. This facilitates high-efficiency start-up of the system and assures flexibility in meeting maximum use-demands for the compressed air with minimum air compressor equipment design requirements.

While it is contemplated that, under most conditions, adequate compressed air volume storage capacity can be provided in the multiple grid plumbing system constructed from large diameter pipe surrounding the major areas of use, it is recognized that in certain installations such as in congested sea shore cities or on islands, space requirements on shore may limit installation of such conduit systems. Under these conditions, an offshore floating dock installation according to the present invention and including multiple interconnecting layers of piping may be joined together to provide storage for the compressed air. These floating docks are to be provided with a suitable anchorage system to permit self-adjustment, with the docks themselves providing support for the multiple diverse energy collector-converter-driven air-compressor stations.

BRIEF DESCRIPTION OF THE DRAWINGS

The foregoing and other features and advantages of the integrated energy system according to the present invention will become more apparent from the detailed description thereof contained herein below, taken in conjunction with the drawings, in which:

FIG. 18 is a fragmentary plan sectional view taken on line 18—18 of FIG. 17;

FIG. 19 is a fragmentary plan sectional view taken on line 19—19 of FIG. 17 and showing the linkages for operating the bottom brake shoes for the turbine;

FIG. 21 is a schematic view of a two-way air flow metering apparatus employed in the system;

FIG. 22 is a schematic view showing an automatically and manually triggered isolation valve employed in the plumbing system;

FIG. 23 is a sectional view through a manhole and including a typical main grid line condensation blow-off means;

FIG. 24 is a fragmentary plan sectional view showing an expansion-contraction pipe joint for use in the pipe in the conduit system.

DESCRIPTION OF THE PREFERRED EMBODIMENTS

Figure 1:
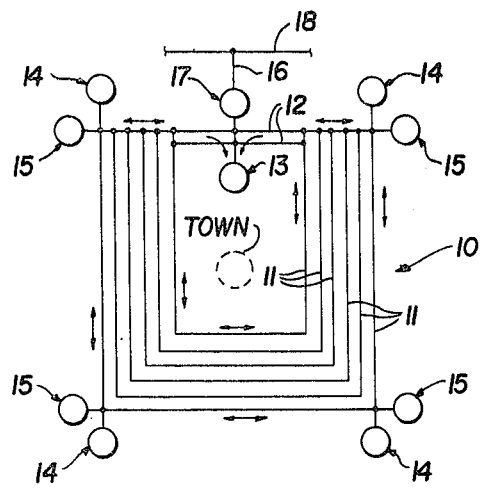
FIG. 1 is a schematic plan view of an integrated energy system module for a small consumer of electricity.

Referring now to the drawings in detail, a preferred embodiment of the invention will be described in which numerous energy sources are utilized to compress air which is stored under pressure in an interconnected network of transmission pipes of maximum commercial size required and available which is haulable on trucks and having sufficient total bulk storage capacity for maintaining a long term reserve storage, and for utilizing the compressed air for the generation of electricity at or near the points of use and at a rate determined by the requirement for electrical energy. The compressed air is utilized, through automatic, coordinated pressure and volume controls, to drive air motors which, in turn, power conventional electrical generators to supply electrical energy for conventional uses. The coordinated pressure and volume controls enable the air motor to drive the generators at a precisely controlled speed throughout the load range capabilities of the generators.

The transmission and storage pipe network employed in the system is designed in a plurality of modules which are interconnected and which may be automatically or manually isolated when desired or necessary, with the individual modules containing sufficient interior volume storage capacity to operate electrical generating equipment to supply electrical energy to the geographical area encompassed by the module for a substantial period of time, preferably for several days. Each module is supplied with compressed air by multiple systems of air compressors described more fully herein below, at least a portion of which are preferably driven by non-poluting natural energy sources such as wind, solar, thermal, water, wave, or tide powered energy collectors. However, a portion of the compressor installations in each module preferably are capable of employing conventional power sources such as gas or steam engines or turbines.

By providing an interconnecting transmission and storage grid pipe network joining the respective modules, a more complete utilization of natural energy sources may be employed. Thus, in areas where ocean tide and wave energy, or water power from streams is generally not available, wind power turbines according to the present invention may be utilized, along with solar-power converters, as the principal sources of natural energy to be employed to provide the compressed air. However, as is well-known, air movements are not uniform and it may be anticipated that wind turbines employed in a particular module will be able to supply an excess of air during the terms of high wind movement and be unable to supply sufficient quantity of air during prolonged periods of relative calm. Likewise, solar-power converters will not run at night nor on cloudy days. By interconnecting the respective modules, it is possible to more evenly balance the system, with compressed air flowing out of a particular module during times of high wind, and on bright and sunny days, for example: or drawing from other modules having an extra energy supply in times of relative calm or during prolonged cloudy conditions. Due to check valve special spring loadings, small systems will release excess air pressure to adjoining systems.

Only the module and grid system according to this invention makes it possible to construct the system in steps, gradually expanding same, town by city by region, to a complete integrated national or continental energy system. On such a large scale, the grid network preferably includes a basic grid covering and dividing the entire area into relatively large regions, with the individual towns, cities and metropolitan areas therein each having independently operable grid systems interconnected with each other and to the main grid system. By use of automatically and/or manually controlled automatic valves, entire regions as well as individual modules may be isolated. Further, meters are employed at each junction of a module to a region, or region to a national grid to measure the flow of air into or from the over-all system. The meter readings are then employed to compute the net supply and utilization of compressed air by the individual modules. Thus, a module, whether for an individual town or for a large metropolitan area, may be charged for drawing excess air from the system, or may receive a payment or credit for supplying air utilized by other modules connected in the system.

Referring now to FIG. 1, a typical module for a small town or a large individual user of electrical power is designated generally by the reference numeral 10 and includes a plurality of collection-transmission-storage pipes 11 extending in generally parallel relation around the user, indicated generally as a small town. The transmission and storage pipes 11 are interconnected as by pipe 12 to permit the free flow of compressed air between the respective pipe. The number, size, and length of the transmission and storage pipes 11 will obviously be determined by the projected requirement of electrical power to be generated and utilized within the geographical area serviced by the module. However, it is preferred that the transmission and storage pipes 11 be of the largest needed diameter commercially available and economically feasible, with the length of pipe utilized being sufficient to provide a storage capacity sufficient to supply compressed air for a substantial length of time, and preferably for several days, to operate a compressed air motor driven generator station designated generally by the reference numeral 13.

At spaced points around the module 10 are located a plurality of compressor stations for supplying compressed air to the transmission and storage pipes 11. In FIG. 1, where a generally rectangular system of transmission and storage pipes are utilized surrounding the area serviced by the modules, there is schematically illustrated two compressor stations located at each corner of the module. Preferably at least one of each of these pairs of compressor stations will be capable of utilizing a non-polluting, natural energy source, with at least a portion of the compressor stations also being capable of being driven by solar powered or by conventional fueled steam or heat differential engines in a relatively small module, half of the compressor stations may be wind turbine driven stations, designated generally by the reference numeral 14, and the other half, designated generally by the reference numeral 15, powered by solar power or by conventional fueled steam or heat differential engines.

Initially, a module of the type illustrated in FIG. 1 may operate entirely independently of other modules; however, as more modules are installed, and the regional or national grid system developed, the respective modules will be connected, through a pipe 16 and meter 17 to the grid transmission storage line 18.

Figure 2:
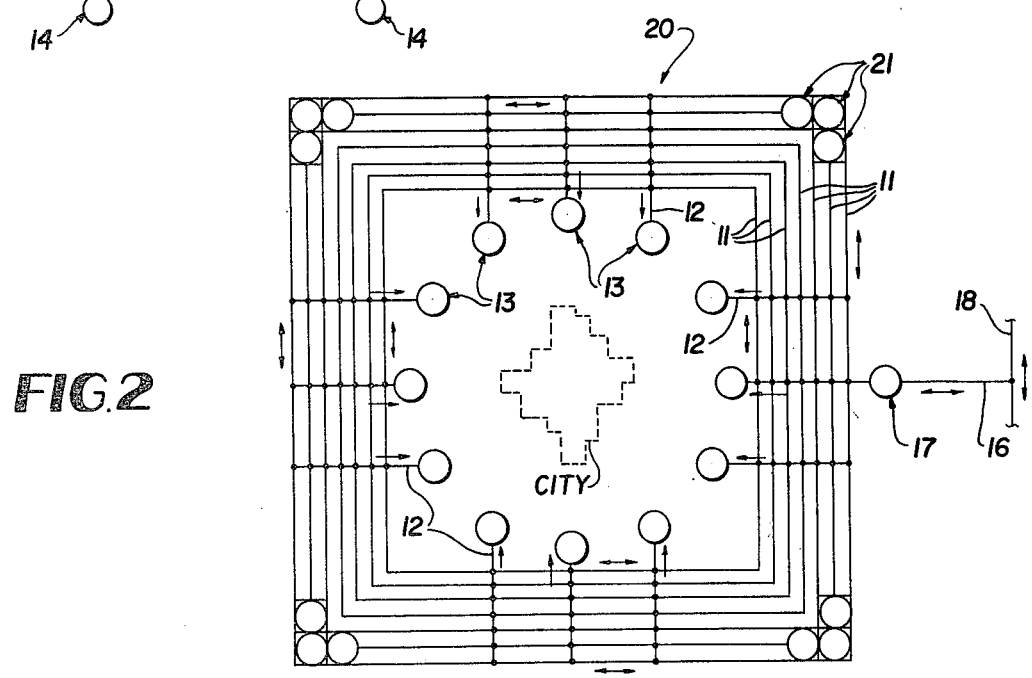
FIG. 2 is a view similar to FIG. 1 and showing an integrated energy system module for a large city or metropolitan area.

The larger module shown in FIG. 2 and utilized for a larger consumer of electricity such as a large city or metropolitan area is quite similar in design and construction to that of the small module shown in FIG. 1, with the principal difference being size, and accordingly, similar reference numerals are used to designate similar elements in the two figures. Thus, FIG. 2 illustrates a module, designated generally by the reference numeral 20, in which a typical city or large metropolitan area is generally surrounded by a network of transmission and storage pipes 11 joined together at spaced intervals by connecting pipes 12 which, in turn, are illustrated as supplying compressed air from the system to a plurality of generating stations 13 at various locations around the module, with the generating stations preferably being located near the highest concentrations of electrical consumption to thereby minimize transmission line losses.

Figure 4:
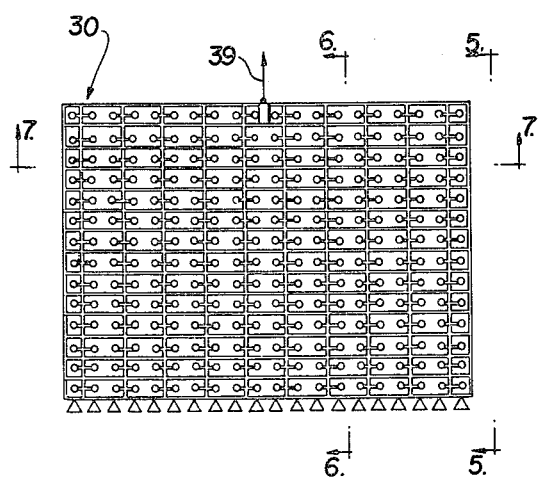
FIG. 4 is a schematic plan view of an energy recovery farm adapted for off-shore floating use.

Compressed air is supplied to the transmission and storage pipe of the module 20 much in the same manner as that described above with regard to the smaller module 10. However, for the larger module 20, energy recovery farms, designated generally by the reference numeral 21 and each consisting of a relatively large number of energy collecting-converting devices such as the wind turbine described more full hereinbelow, are arranged in close proximity to one another in the manner illustrated schematically in FIGS. 3 and 4, to supply compressed air for the system.

Figure 3:
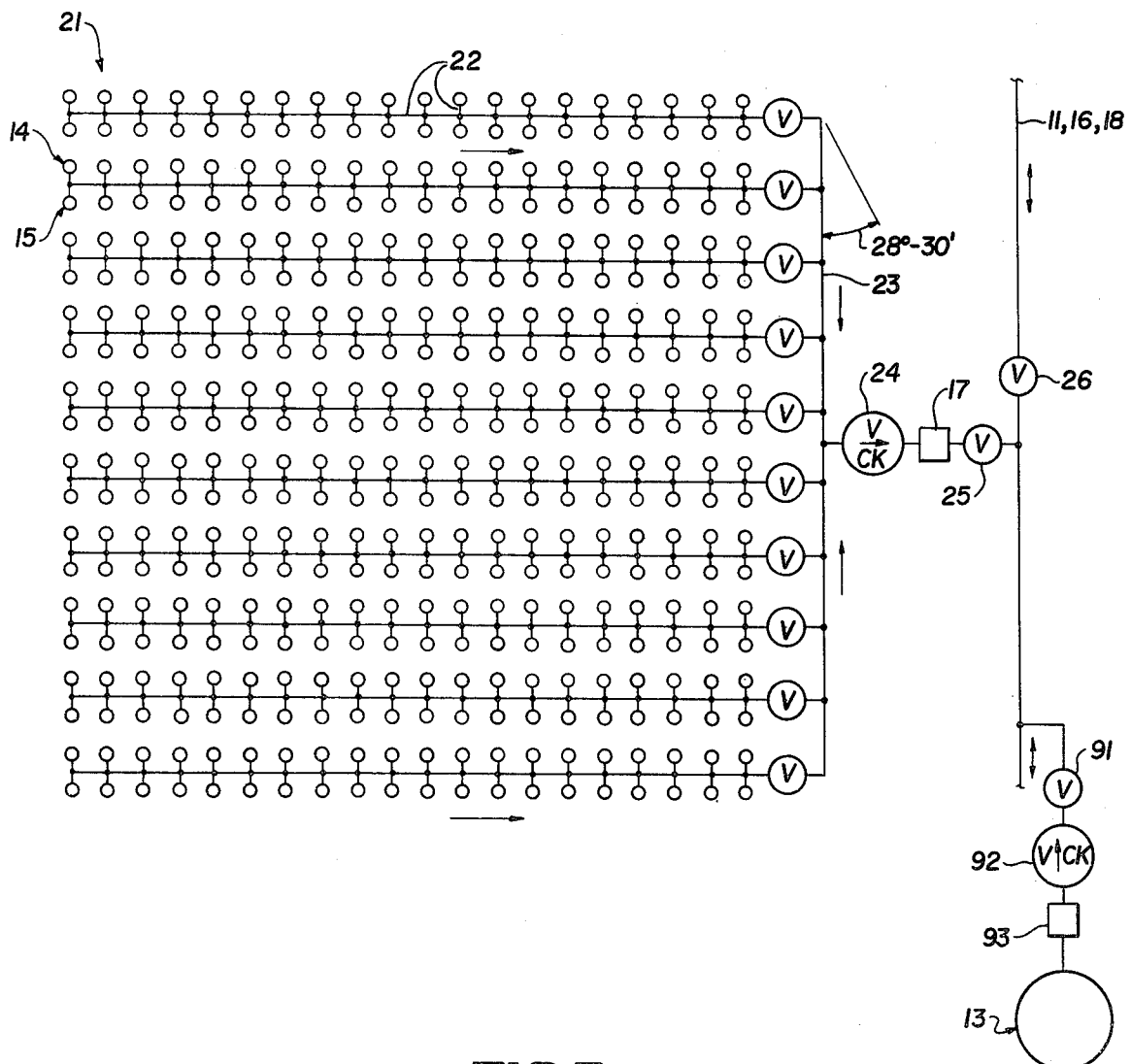
FIG. 3 is a schematic plan view of an energy recovery farm employed in the system.
Figure 5:
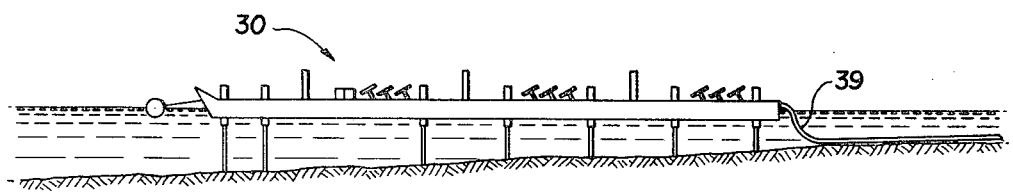
FIG. 5 is a schematic side elevation view of the floating energy farm shown in FIG. 4.

Referring specifically to FIG. 3, the energy farms indicated generally by the reference numeral 21 may comprise a plurality of individual wind turbine driven compressor stations 14, and/or other diverse energy driven stations 15, each having the compressor discharge connected to a collection pipe 22, with the respective collection pipes 22 being connected to a header pipe 23. Header pipe 23 is connected, through a one-way check valve 24 and a cut-off valve 25, to one of the transmission and storage pipes 11. Additional cut-off valves, or isolation valves, 26 are mounted in the lines 11. Also, an airflow meter 17 is installed between check valve 24 and cut-off valve 25 to measure the flow of air from the energy farm 21 into the transmission and storage pipes 11. It is believed apparent that the respective compressor stations in the farm 21 may be driven by any suitable source. The figures 28 degrees plus 30 minutes indicate preferred-orientation of energy-farm quadrants with reference to prevailing winds in areas of location.

As can also be seen in FIG. 3, the respective needed electrical generating stations 13 are connected to the transmission and storage lines 11 through a cut-off valve 91, a one-way check valve 92, and a meter 93.

Figure 6:
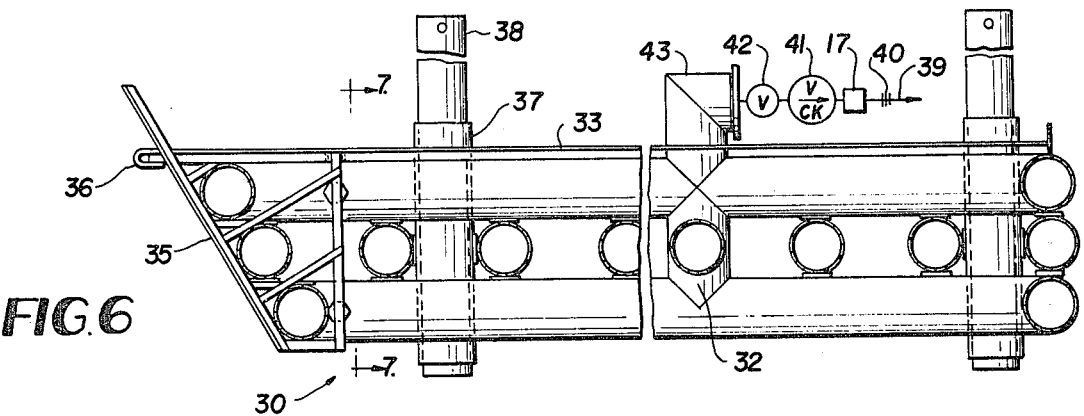
FIG. 6 is a sectional view of the floating energy farm of FIG. 5 on an enlarged scale with the section taken on line 6—6 of FIG. 7 and FIG. 4.
Figure 7:
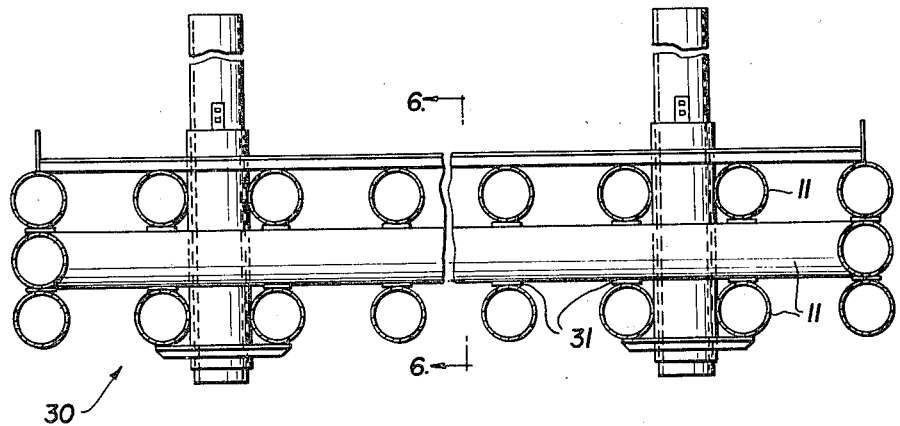
FIG. 7 is a schematic sectional view taken on line 7—7 of FIG. 6 and FIG. 4.

Referring now to FIGS. 4–7, a floating compressed air storage facility for use in coastal regions is illustrated. These floating installations are preferably constructed, in the form of floating docks or floating barges, indicated generally by the reference numeral 30, from multiple interconnecting and sealed layers of sections of transmission and storage pipe 11, with alternate layers of pipe extending at right angles to one another, as best seen in FIGS. 6 and 7. The layers of pipe are separated by welding plates 31 at each point of contact to strengthen the welded juncture and provide a rigid barge-like assembly. The individual pipe sections in each layer are interconnected by pipe section extending at 90° thereto along each end of the respective layers of pipe sections, and the layers are interconnected by vertically extending pipe sections 32 at spaced intervals around the assembly. Preferably the welded assembly is provided with a deck surface 33 which may be employed to support a plurality of energy collection-conversion stations 34 (see FIGS. 8 and 10) including air compressors run by suitable means such as tide or wave driven energy collecting devices or wind turbines of the type described more fully hereinbelow. Also, the welded assembly is preferably equipped with a bow plate 35 to facilitate towing and positioning of the assembly in the open water and, to this end, one or more conventional barge tow couplings 36 may be provided on the assembly.

To anchor the barge assemblies 30 in position, a plurality of vertical guide sleeves 37 are rigidly welded to and extend through the barge assembly. The guide sleeves preferably have their inner surfaces lined or coated with a self-lubricating material such as Teflon to minimize frictional contact with vertical, fixed caisson pilings 38. The pilings 38 are preferably positioned by lowering through the guide sleeves 37 and set by conventional means which lower the pilings to solid rock or into tough hardpan in accordance with known procedure. The caisson pilings preferably will be made of pipe having an external diameter slightly smaller than the internal diameter of the self-lubricating guide sleeves.

When the floating docks or barges 30 are to be positioned in water too deep to make the use of pilings practical, a system of anchors (not shown) may be used to retain the barges in position. This may be accomplished by using a suitable number of large anchors of conventional design, with the anchors positioned outwardly from and at spaced intervals around the respective barges. Wire cables from the respective anchors are secured to the barge via cable tensioning winches which maintain a constant tensile load in the cable and thereby automatically compensate for vertical movement of the barge due to tide changes. The wenches may be powered by air motors if desired, with self-operating pressure-resistance triggered controls.

Air compressed by the compression stations 34 supported on or carried by the floatation barges 30 and stored in the pipe sections 11 which make up the body of the barges 30 is led from the barges to generating stations on shore through large diameter flexible marine hose which is commercially available and indicated as 39 in FIG. 6. The marine hose is connected, through a standard flange coupling 40 to air flow meter 17, a one-way check valve 41 and a cut-off valve 42 to an outlet 43 connected to the storage pipe assembly of the barge. By the use of the heavy-weighted flexible marine hose, which is permitted to lie on the bottom as it is led ashore, vertical movement of the barge can be accommodated. From the shore, the air is led through rigid piping to generating stations in the module service area as required.

Figure 8:
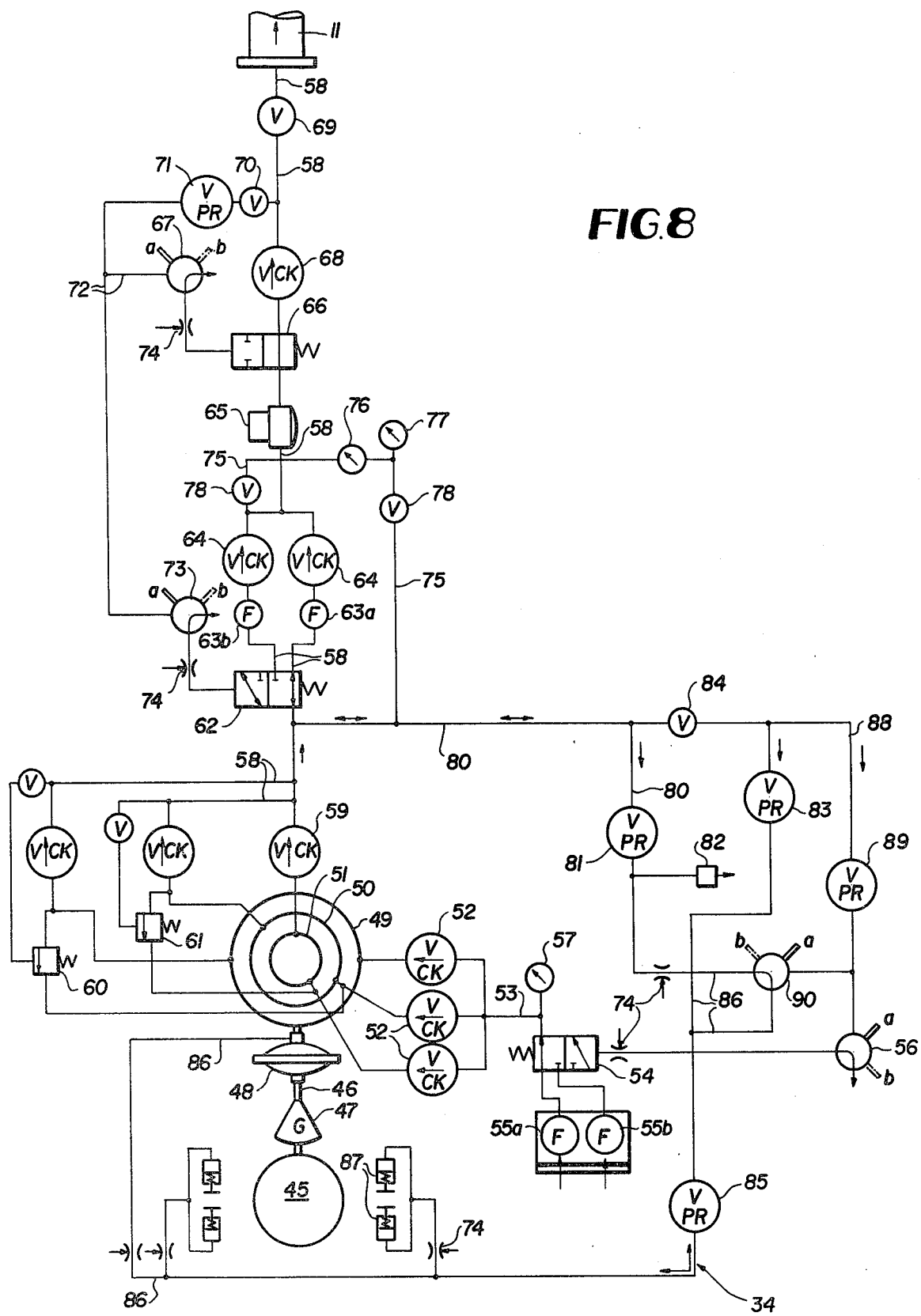
FIG. 8 is a schematic plan diagram of a typical compressor facility employed to provide compressed air for the main grid plumbing line system.

Referring now to FIG. 8, a typical air compressor station and control mechanism will be described in detail. The energy collecting source, whether a wind driven turbine, solar power collector-converter, or other power source, is indicated generally by the reference numeral 45 and is connected, through a suitable shaft 46 and governor 47 to a hydraulic torque converter coupling 48. The coupling 48 is of a minimum speed type control which gives no output rpm until optimum speed is approached or attained. The coupling 48 drives a conventional three stage compressor modified in the manner described hereinbelow or alternatively three single stage compressors connected together in the manner described below.

In FIG. 8, the three stage compressor is indicated schematically by three concentric circles, with the external circle 49 representing the first stage, the intermediate circle 50 representing the second stage, and the center circle 51 representing the third stage of the compressor. The respective compressor stages each have their inlet connected, through one-way check valves 52 and manifold 53 to atmosphere. The manifold 53 is connected through a three-way, two position valve 54, operable to alternately connect the inlet to separate but identical air filters 55. The relative spool position of valve 54 is controlled by a manually operated pilot valve 56 which is operated to select the filter to be used and to permit shifting of filters in response to excess pressure drop. Filter drop is measured by a conventional vacuum gauge 57 connected in the manifold 53.

The respective compressor stages also have their outlets connected directly to a common discharge line 58, through one-way valves 59, and conventional proportionate reduction in piston displacement where each of the compressor stages for higher pressure is followed regardless of whether a single three stage compressor or three interconnected single stage compressors are employed. However, in either case, conventional plumbing between compressor stages is modified by the inclusions of the two non-return air pressure operated check valves 59 one connected in the outlet of the first stage compressor and the other in the outlet of the second stage compressor, and by the inclusion of two air pressure actuated unloading valves 60 and 61 connected one between the outlet of the first stage compressor and the inlet of the second stage compressor, and the other between the outlet of the second stage compressor and the inlet of the third stage compressor. In normal operating conditions, valve 60 is set to unload at approximately 100 psi and valve 61 to unload at approximately 300 psi. These valves, operating in conjunction with the one-way check valves 52 and 59, thus allow all three compressor stages to independently draw and deliver to line 58 maximum volume low pressure compressed air up to the unload pressure setting of valve 60 at initial startup and at all times when system is highly overloaded. When the pressure in line 58 reaches the setting for valve 60 and prior to the pressure reaching the setting for valve 61, the first and second stages will act as a conventional two stage compressor while the third stage will continue to operate as a single stage compressor taking its inlet from the atmosphere. Upon the pressure in the system reaching the setting for valve 61, the valve spool position will shift to open, thereby connecting the outlet of the second stage to the inlet of the third stage, causing the three stages to then operate in the manner of a conventional three stage compressor. This operation will thereafter continue during all normal system operating conditions, with all three stages being serviced by the suction inlet of the first stage compressor and with all pressure outlets served, in normal succession, by the pressure outlet of the third stage. Thus, the pressure responsive compressor control system, responding to system pressure, automatically controls the compressors to deliver low, intermediate, or high pressure air, at inversely varying flow rates, to the pipe system.

Compressed air flows from the compressor unit through pipe 58 to a two position, three-way selector slave valve 62 which is normally spring loaded to a straight through flow position and operable either manually or automatically as described below to the alternate position, to direct the compressed air through one or the other of two high pressure air filters 63 and one-way check valves 64, with the discharge from the respective check valves being connected to direct the flow through meter 65. The outlet of meter 65 is connected to a two-way slave shut-off valve 66 which is normally spring loaded to the open position and which may be system pressure closed by manual shifting of two position, three-way pilot valve 67 from indicated normal position "a" to closing position "b." From main shut-off valve 66, air flows through a one-way check valve 68 and a manually operated shut-off valve 69 to discharge into the transmission and storage pipe 11.

In the valve operation just described above, main line pressure is fed, through a shut-off valve 70 and a pressure reducer 71 to the two-position, manually actuated pilot valve 67 to supply actuating pressure to the shut-off valve 66. Reduced pressure is also supplied through line 72 to a manually actuated pilot valve 73 for directing operating pressure, through a suitable speed control regulating orifice 74, to the filter selector valve 62. A similar metering orifice is connected in the pressure line between valves 67 and 66.

A pipe 75 is connected in a loop around valve 62, filter 63 and check valves 64, and a differential pressure gauge 76 is connected in line 75 to give a visual indication of the pressure loss across the filter 63 actually in use, and act as an indicator directing the operator when he is to actuate the valve 73 to shift from dirty to clean filter use. A standard system pressure gauge 77 is also preferably connected to line 75, and a pair of shut-off valves 78 in line 75 may be employed to isolate the gauges 76 and 77.

System air pressure is provided in a line 80 connected to compressor discharge line 58 and a spring-loaded safety valve 81, having a discharge vented to atmosphere through a silencer 82, is connected in the line 80 to provide safety relief for the system. A second safety valve 83, normally set to actuate at a pressure lower than safety valve 81, is connected to line 80, through a valve 84. The outlet of safety valve 83 is connected, through a pressure reducing valve 85 to line 86 leading to clutch 48 to automatically disengage the clutch in the event of overpressurization of the system. Simultaneously, pressure is applied, through speed control orifice valves 74, to a brake or damper system 87 for shutting down the power source 45. A speed control orifice valve 74 is also connected in line 86 between the pressure reducing valve 85 and the clutch 48.

A high pressure line 88 bypasses safety valve 83 and is connected to a pressure reducing valve 89 for supplying reduced air pressure to pilot valve 56 for controlling, through speed control valve 74, the position of low-pressure filter selector valve 54; and to supply pressure to a second manually actuated pilot valve 90 connected between lines 88 and line 86. Valve 90 may be manually actuated to apply pressure to line 86 to manually control actuation of the brakes and disengagement of the clutch 48. In the normal operating condition, valve 90 is connected, through and adjustable speed control orifice valve 74, to atmosphere through silencer 82 to thereby slowly bleed pressure from line 86 to permit the brakes 87 and clutch 84 to be released and ready for automatic actuation upon return of safety valve 83 to the normal closed operating position.

Figure 9:
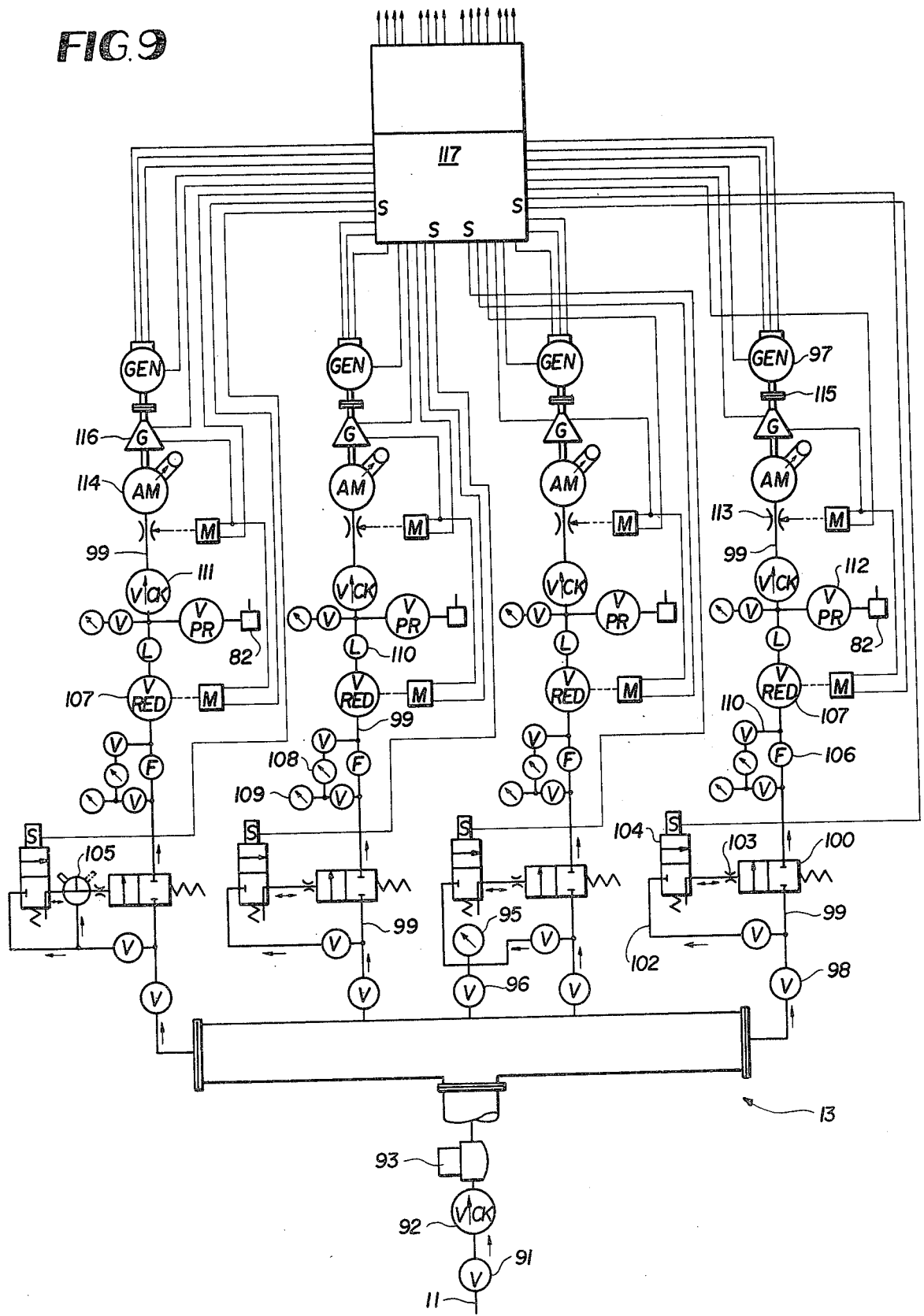
FIG. 9 is a schematic plan diagram of a precision RPM control system for air motor drives, for conventional electrical generators, employed in the compressed air driven power plants.

Referring now to FIG. 9, compressed air from the respective compressor stations described above flows through the transmission and storage lines 11 to electrical generating stations located at convenient positions within the module being served. At the respective generating stations, air flows through a normally open motor actuated, automatic or manually controlled shut-off valve 91 and a one-way check valve 92 to a flow meter 93 and into a manifold header 94. A standard sight gauge 95 is connected, through valve 96, to manifold 94 to provide a visual indication of manifold pressure.

A plurality of electrical generators 97 are operated at the generating station each from a separate air line from the manifold 94. The respective generators, and their control systems, are substantially identical, with four such generators being illustrated in FIG. 9. Accordingly, only one will be described in detail, it being understood that the description applies equally to the other generators except for the manual start-up control for the first generator.

Air flows from the manifold 94 through a normally open manually operable shut-off valve 98 in an air line 99 to a two-position normally closed shut-off slave valve 100. Valve 100 is spring loaded to the closed position and opened against spring pressure by system air pressure supplied through valve 101 and line 102 through a flow restricting orifice valve 103 in the valve 100. Connected in line 102 is a normally closed, solenoid-actuated pilot valve 104 for controlling the flow of air to valve 100 during normal operating conditions. Also, to initially start up the system, a manually actuated, two-position, three-way valve 105 provides, in one position, direct communication between the pilot valve 104 and shut-off valve 100, and in the other position gives direct communication between line 102 and the valve 100, bypassing the solenoid-actuated pilot valve 104 for manual start up conditions. The manual valve 105 is provided only for one of the generators at a station, and in the FIG. 9 embodiment is provided only in the generator at the left side of the drawing.

From the slave valve 100, air flows through a filter 106 to a motor-actuated, variable pressure delivery reducing valve assembly 107. A high pressure gauge 109 and a pressure differential gauge 108 are connected in a line 110 across filter 106.

From the pressure reducer assembly 107, air flows through a line lubricator 110 to a check valve 111. Connected in the line between the lubricator and check valve 111 is a pressure relief, or safety valve 112 which vents to atmosphere through a suitable silencer 82. A second sight gauge is preferably connected in the line downstream of the lubricator to provide a visual indication of the lowered line pressure.

From the check valve 111, air flows through a motor operated variable flow restriction orifice 113 to an air motor 114 which vents spent air to atmosphere preferably through a suitable silencer 82.

Air motor 114 drives a generator 97 through a shaft coupling 115, and a governor type gravity controlled fully reversing electrical switch, actuated by a geared drive from the air motor drive shaft, senses the motor speed and controls actuation of the one or more electric motor drives of the pressure delivery reducing valve 107 and the variable orifice 113. An insufficient speed reflected on the governor switch 116 will demand additional pressure and volume delivery to the air motor, and will supply current from suitable contacts in the governor switch 116 and in the customary use demand meter 117 to drive the reversible motors in the direction to increase both volume and pressure. An excessive speed sensed by the governor switch 116 will reverse the flow of current to reduce pressure and volume to air motor 114. Preferably, the motors actuating the valve assembly 107 and the variable orifice 113 operate through a low speed reduction gear mechanism to provide precision control of air flow. Governor switch 116 is a conventional item available commercially.

To start up the system, the manual start up valve 105 is placed in the "b" position, thereby pressurizing the slave valve 100 which is shifted to the open position at a slow rate due to the controlled flow of air through the orifice 103 to gradually bring up the speed of air motor 114 and generator 97 to the predetermined optimum speed of rotation. As the customer use demand meter 117 is energized and calls for the generation of more electricity, solenoid valve 104 will be automatically energized and opened by electrical current from contacts in the meter 117. Thereafter, valve 105 may be normally shifted back to the normal, straight through position "a" and further successive operation of the various electrical generator drives will be automatically controlled by the use demand meter. By providing additional sets of contacts in the conventional use demand meter, as the output of the first generator approaches maximum, the second solenoid switch will be energized to bring the second generator up to speed and on line. This procedure will automatically be followed up to the full capacity of all generator sets through the contacts in the use demand meter, and generators will similarly be dropped from the line as use demand drops.

Figure 10:
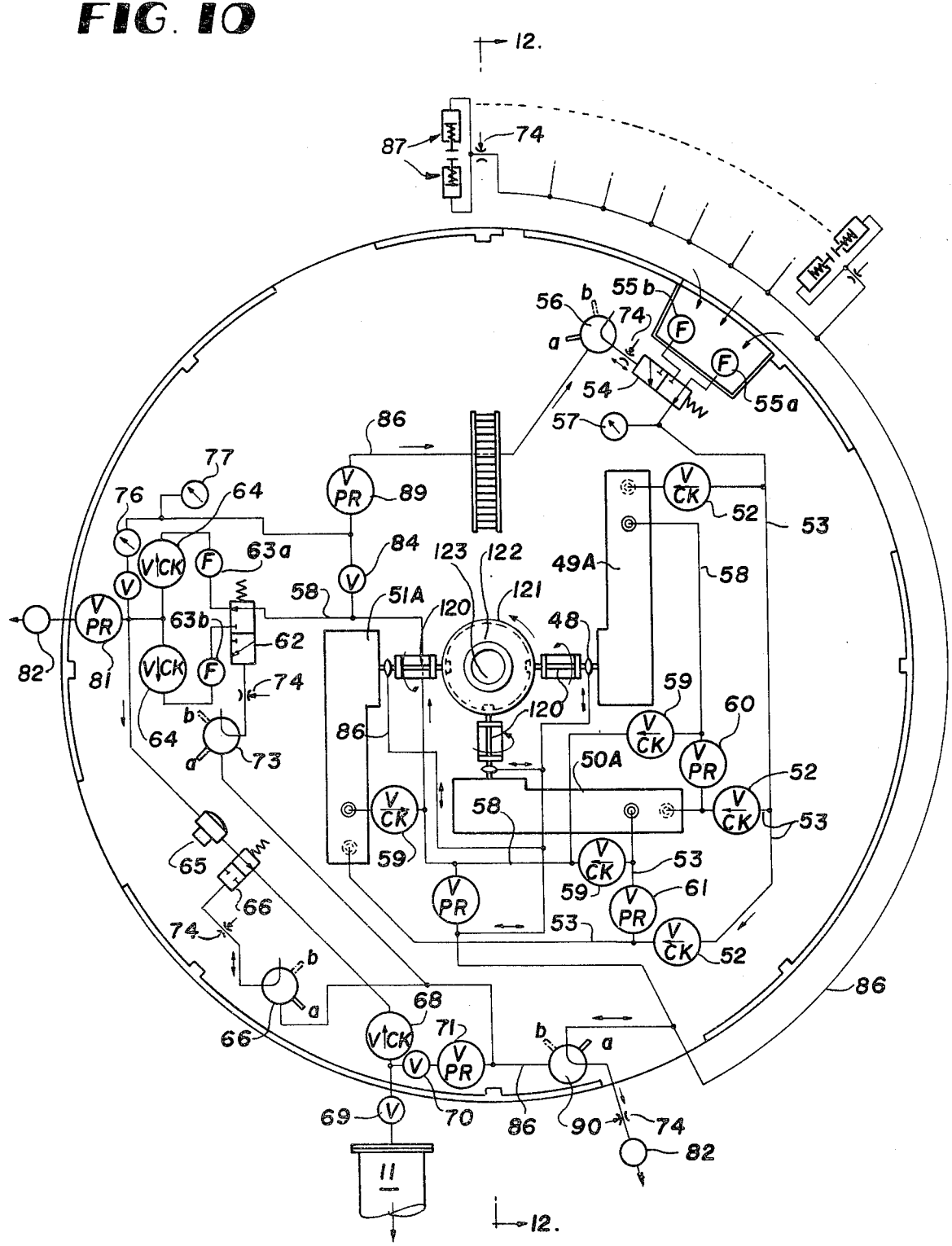
FIG. 10 is a schematic plan diagram of a typical wind powered, vertical turbine driven air compression facility employed in the system.

Referring now to FIG. 10, an air compressor installation similar to that described hereinabove with regard to FIG. 8, but particularly well adapted for use with a wind turbine of the type described hereinbelow, will be described in detail. Since many of the components of the compressor installation of FIG. 10 are identical, either actually or functionally, with that described with regard to FIG. 8, similar reference numerals will be used to designate similar parts. Thus, the compressor station is preferably installed beneath the circular base of the air turbine frame structure and is illustrated as employing three separate, single stage compressors 49A, 50A, 51A corresponding to the first, second and third stages, respectively, of the three stage compressor described above. The compressors each have their inlet connected, through check valves 52 to a manifold 53 which, in turn, is connected through the two position filter selector slave valve 54 to one of the two filters 55. Selection of the position of valve 54 is controlled by the pilot valve 56 as described above.

Each of the compressors have their outlets connected, through one-way check valves 59 to manifold piping 58 which, in turn, is connected to the transmission and storage pipe 11 through the filter selector slave valve 62, filters 63, check valves 64, meter 65, slave shut-off valve 66 and final check valve 68. The respective compressors are driven by geared shafts 120 which, in turn, are driven by a bull gear 121 rigidly mounted on the base of turbine hub shaft 122 journaled for rotation about a central fixed shaft 123. The hub shaft 122 is driven by the horizontal supports or spokes 124 for the vertical turbine blades 125. Also, suitable clutch means (not shown), are provided between the compressor and the drive shaft 120.

A pilot operated unloading valve 60 is connected between the check valve 59 of compressor 49A and the inlet of compressor 50A between the compressor and its inlet check valve 52, and a similar pilot operated unloading valve 61 is connected between the outlet of compressor 50A and the inlet of compressor 51A. As described above, valves 60 and 61 are set such that, as the outlet or main system pressure reaches a predetermined minimum, valve 60 will be actuated to connect the outlet of compressor 49A to the inlet of compressor 50A. Between this predetermined minimum pressure and a second predetermined pressure setting for valve 61, the outlet of compressor 50A and compressor 51A will each be discharged into the system outlet; however, above this second predetermined pressure, valve 61 will be actuated to connect the discharge of compressor 50A to the inlet of compressor 51A so that the three independent compressors will thereafter operate as a single, conventional three-stage compressor in the manner described above. Controls for the operation of the clutch and braking system are functionally the same as described above with regards to the embodiment of FIG. 8.

Figure 11:
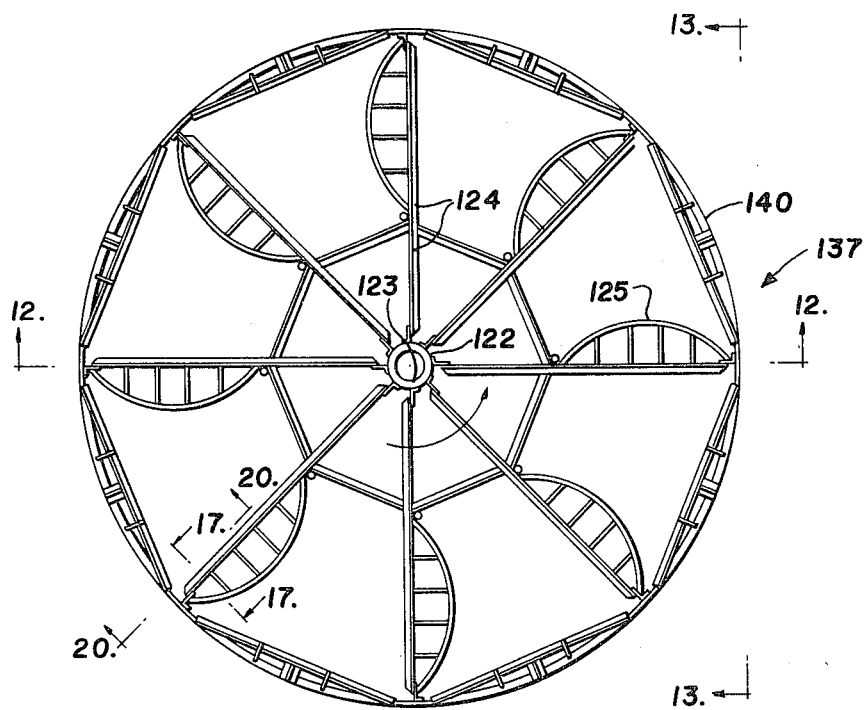
FIG. 11 is a plan view of a vertical air turbine showing the blade arrangement and support framing thereof.
Figure 20:
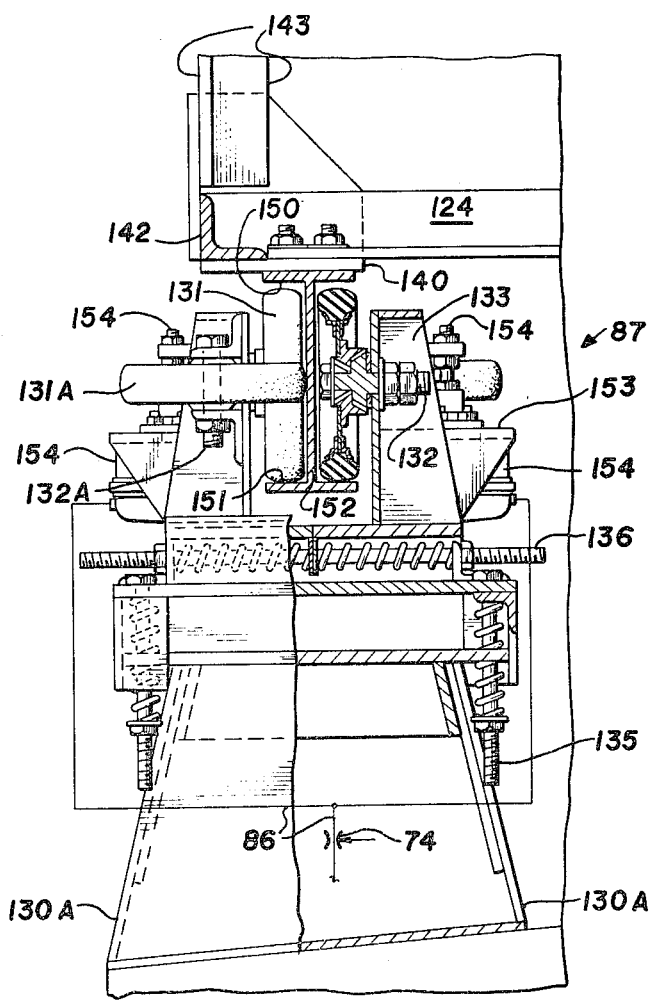
FIG. 20 is a fragmentary sectional view taken on line 20—20 of FIG. 17.
Figure 12:
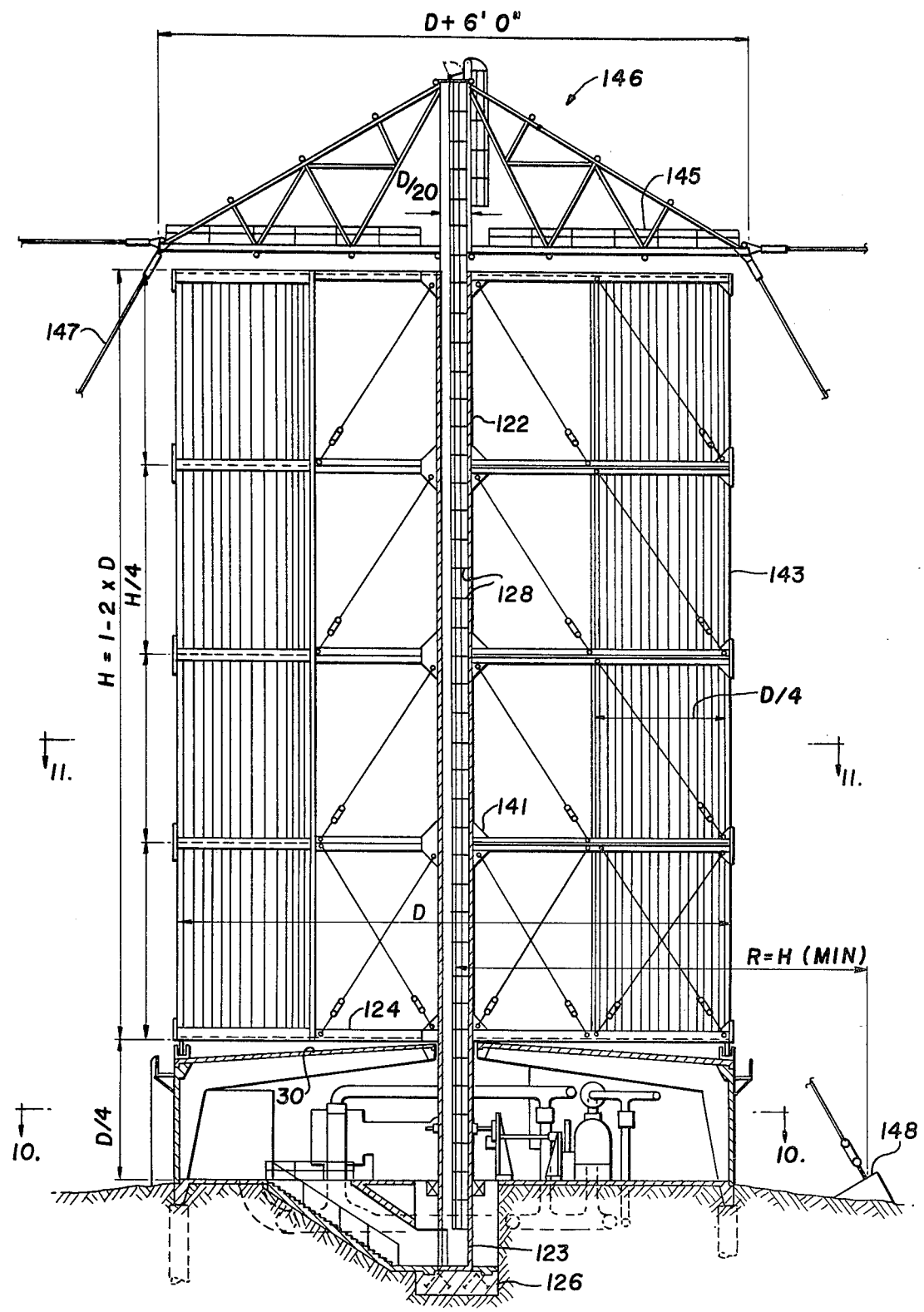
FIG. 12 is a sectional view of the wind turbine and air compression facility driven thereby.

Referring now to FIGS. 11 through 20 of the drawings, a wind turbine particularly suited to drive the air compressors employed in this invention will be described in detail. In FIG. 12, the turbine base is set on a fixed foundation 126 which anchors and rigidly supports the fixed vertical shaft 123. Preferably, shaft 123 is in the form of a large-diameter pipe having an access door 127 at its base, and a ladder assembly 128 mounted in the pipe permits maintenance personnel to ascend the structure regardless of rotation of the turbine. A plurality of maintenance access openings 129 are also provided in the fixed shaft 123 at the level of the main turbine bearings 138 and 139, illustrated in FIGS. 14 and 16 and described more fully hereinbelow.

Extending upwardly from foundation 126 is a fixed, annular frame structure 130 having mounted on its top surface and extending around its outer periphery a plurality of guide rollers 131 (see FIG. 20) mounted in opposed pairs by horizontal stub shafts 132 supported by brackets 133 which, in turn, are mounted on a support table 134 the top of which is four-way spring loaded vertically about multiple retaining screws 135 and horizontally about multiple retaining screw assembly 136 mounted on the fixed frame 130. Additional guide rollers 131A are mounted in opposed pairs by vertical axle shafts 132A supported in brake assemblies 133.

Figure 13:
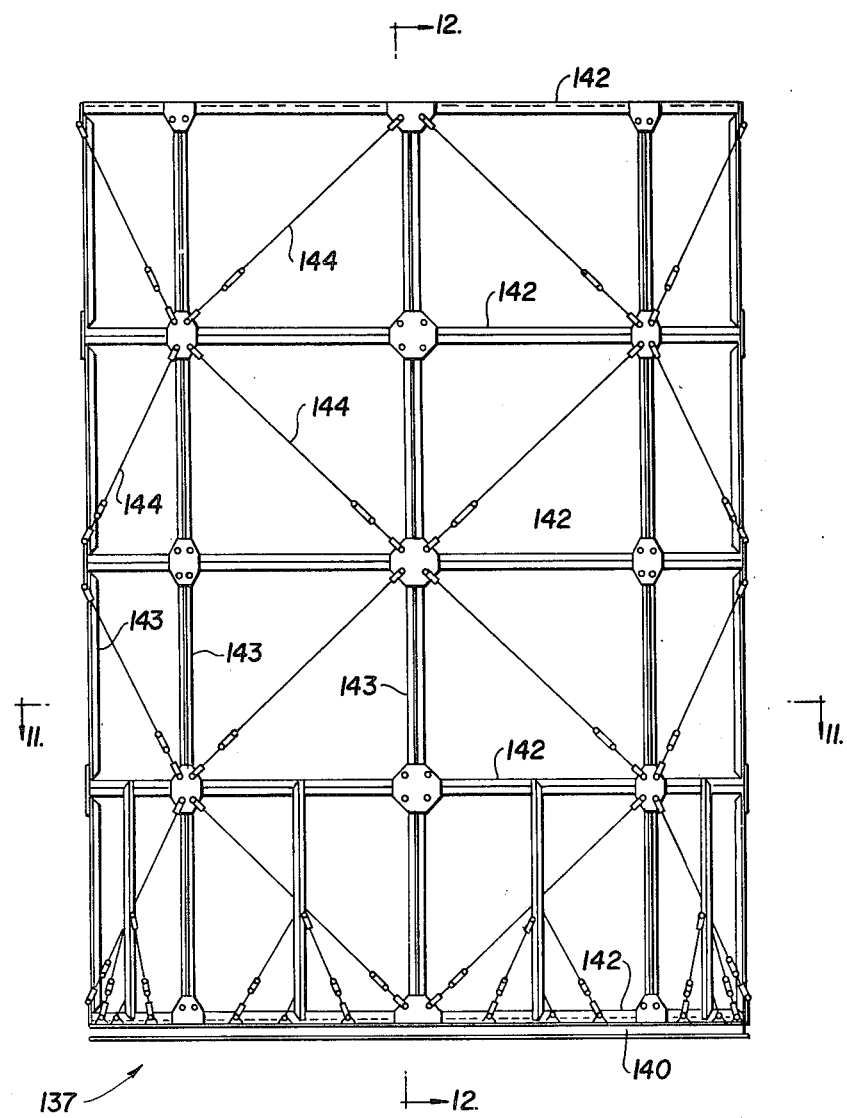
FIG. 13 is a side elevation view of the frame structure around the periphery of the horizontal revolving vertical wind turbine.

A revolving blade support wheel frame structure indicated generally by the reference numeral 137 in FIGS. 11 and 13, is supported on the fixed frame 130 and the fixed shaft 123 for rotation about the vertical axis of the fixed shaft by the upper and lower bearing assemblies 138, 139, respectively and by an annular, flanged monorail track 140 adapted to engage and be guided and supported by the plurality of pairs of guide rollers 131 and 131A.

The rotating frame 137 includes the vertical rotating hub shaft 122 having the horizontal spokes 124 rigidly mounted thereto, as by brackets 141, at spaced points along the length of the shaft 122, and the outer ends of the spokes, at each level, are connected by horizontal girts 142 extending around the periphery of the rotating frame, and the respective levels of spokes are joined by vertical columns 143, as best seen in FIGS. 11 and 13. As previously indicated, the fixed vertical turbine blades are mounted on the outer ends of the spokes 124 for rotation therewith about the vertical axis of the assembly, with the vertical turbine blades extending, in effect, throughout the heights of the rotating frame assembly 137.

A plurality of adjustable sag rods, or braces 144 provide structural integrity for the rotating frame assembly. A fixed catwalk assembly 145 is mounted on the upper end of the fixed shaft 123 which projects above the top of the rotating frame assembly, with the catwalk assembly 145 being supported by a suitable conical truss frame assembly 146. The catwalk and truss assembly provides access for maintenance at the top of the assembly, and provides anchorage at the outer periphery of the assembly for a plurality of guide lines 147 which extend to suitable anchors 148 at spaced points around the periphery of the turbine structure.

Referring now to FIGS. 17 through 20, the brake system is illustrated as including a plurality of pneumatically actuated opposed action brake assemblies 87 mounted in pairs at spaced intervals around the frame 130 in position to engage the top and bottom flanges 150, 151 respectively, of track 140, with the brake assemblies in the respective pairs engaging the flanges on opposed sides of the central web 152. The brake assemblies are identical in structure and operation and accordingly only one will be described in detail, it being understood that the description applies equally to the remaining brake assemblies.

Figure 17:
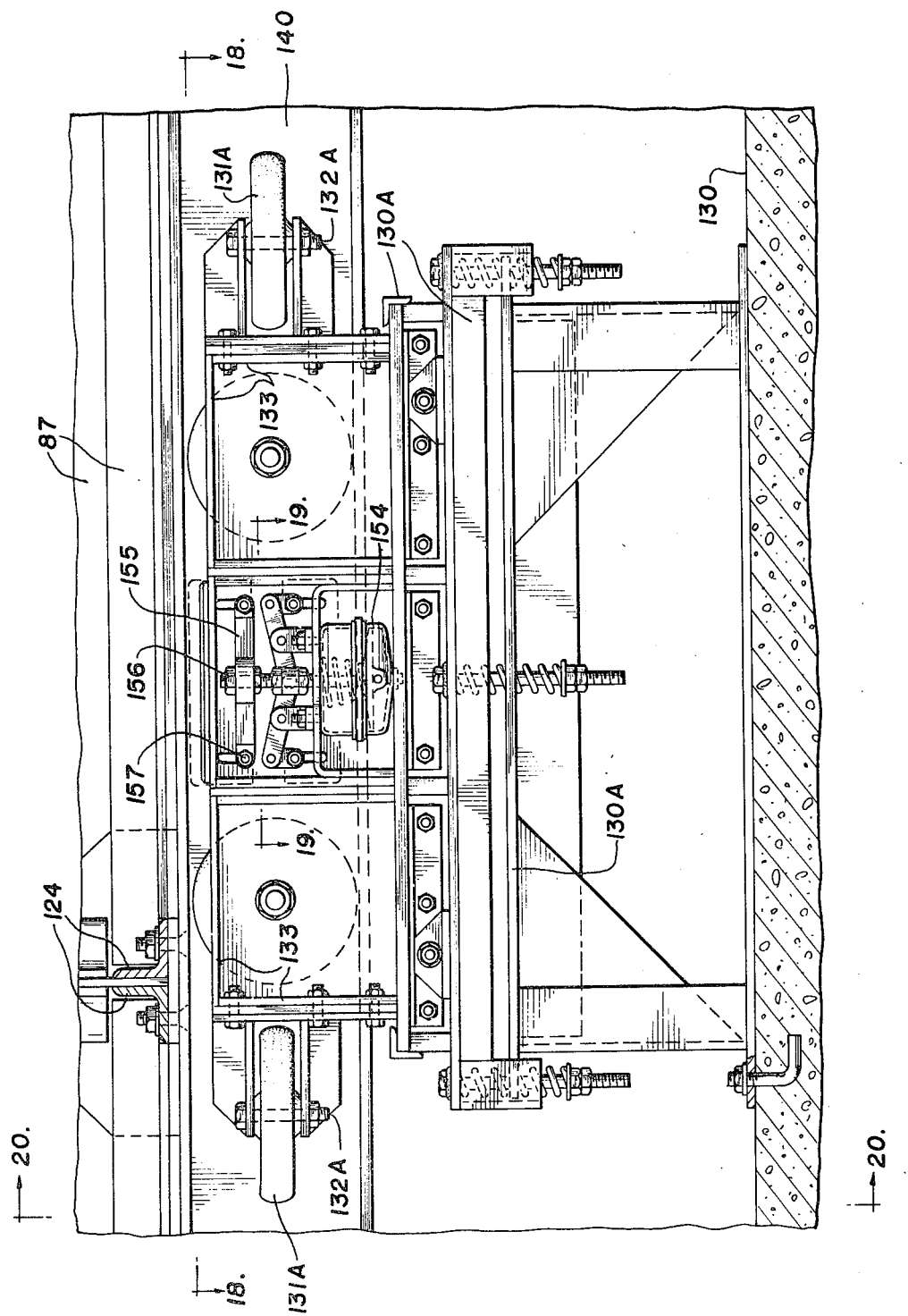
FIG. 17 is a fragmentary sectional view taken on line 17—17 of FIG. 12.

As best seen in FIGS. 17 and 18, the bracket assembly 133 includes, in its central portion, a fixed shelf 153 having mounted, on its bottom surface, a spring-biased, pneumatically actuated brake cylinder 154, the rod of which projects upwardly through the shelf to actuate the brakes. Mounted on the top of the brake cylinder rod is a top actuating arm 155 retained in position by a pair of locking nuts 156 on the upper end of the rod. A pair of horizontally extending bolts 157 are mounted, one in each end of the arm 155, with the bolts projecting inwardly through slots in the vertical web of bracket 133. Supported on the distal ends of bolts 157 is a brake shoe mounting bracket 158 for sliding movement along the vertical face of the web of bracket 133. A brake shoe 159 mounted on the top surface of bracket 158 is adapted to engage the undersurface of the top flange 150 to brake the rotating turbine support frame assembly.

At the same time, a lower brake shoe 160, mounted on a second mounting bracket 161, is pressed downwardly into engagement with the top surface of the lower flange 151 by a second pair of the horizontal bolts 157 projecting through a second pair of slots in the web of the bracket 133. Movement of the lower mounting shoe is effected by a pair of pivoted arms, each having its inner end pivotally connected to the piston rod of the brake cylinder 154 and its outer end pivotally connected to the horizontal bolts 157, and having an intermediate point pivotally connected to an upstanding bracket 162 mounted on the shelf 153. Thus, actuation of the brake cylinder 154 by the application of air, at reduced pressure, through the line 86 and the flow restrictors 74 will project the cylinder rod upward to simultaneously urge brake shoes into frictional contact with both the upper and lower flanges of the track 140, on each side thereof, and at spaced points around the periphery of the turbine frame assembly. As described hereinabove, upon leakage of the air pressure from the line 86, the brakes will automatically be released by the spring biased brake cylinder.

Figure 14:
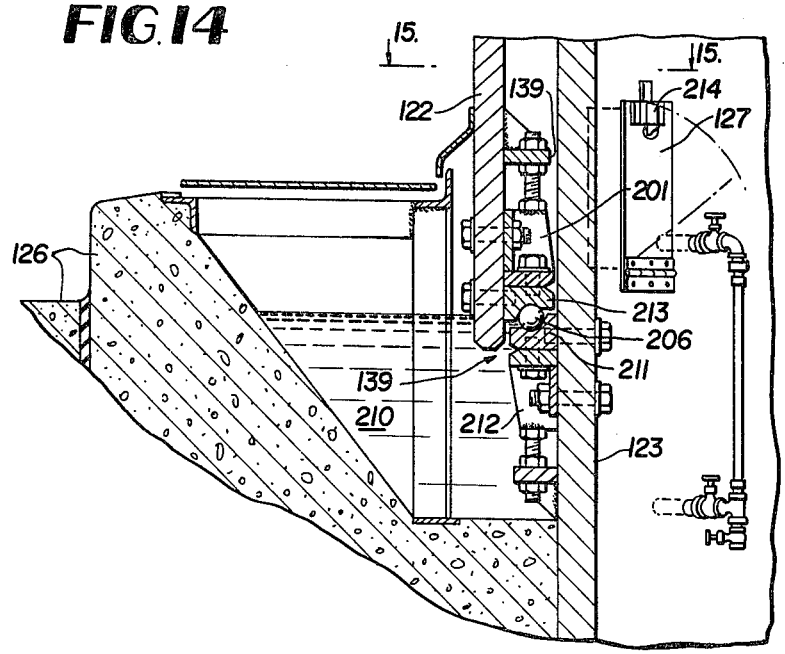
FIG. 14 is a fragmentary sectional view, on an enlarged scale, of the central hub and bearing at the base of the revolving turbine.
Figure 15:
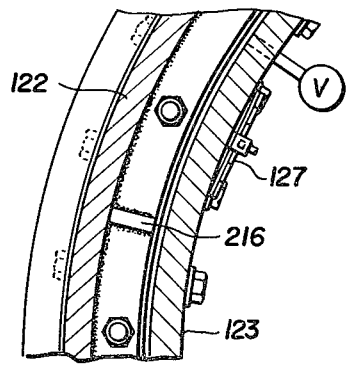
FIG. 15 is a fragmentary plan sectional view taken on line 15—15 of FIG. 14.
Figure 16:
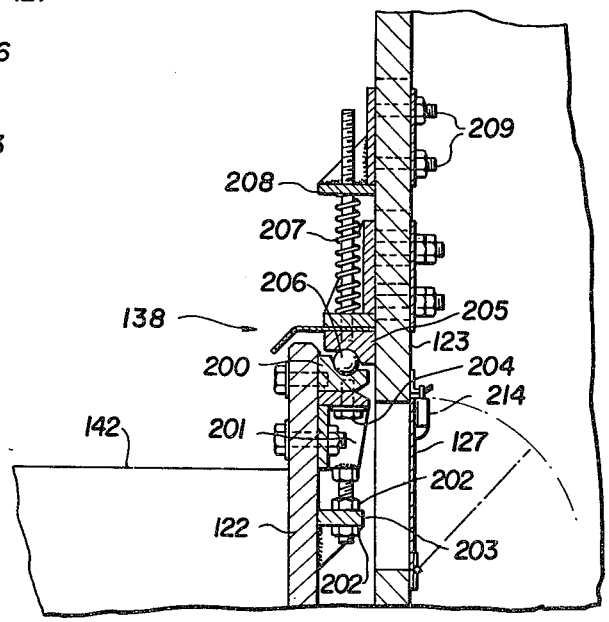
FIG. 16 is a fragmentary sectional view of the central hub and bearing at the top of the revolving turbine.

Referring now to FIG. 14, 15 and 16 of the drawings, it is seen that the upper bearing assembly 138 comprises a lower annular ball race 200 supported on the top inner peripheral portion of the rotatable hub shaft 122. The lower bearing race 200 is accurately positioned by an adjusting bracket assembly 201 which is vertically movable by nuts 202 which engage a fixed flange 203. Once the race 200 is accurately positioned, it is locked in place by suitable set screws 204. The bottom race and the adjusting bracket assembly is accessible from the interior of the fixed shaft 123 through the door opening 127.

The upper race 205 is mounted on the outer peripheral surface the fixed shaft 123 in position to roll on spherical ball bearing elements 206 disposed between the upper and lower races. A second adjustable bracket assembly 207 supported from an annular flange 208 on shaft 123 provides means for adjusting the position of the bracket 207, and set screws 209 are provided to firmly anchor the mounting bracket in position.

The lower bearing assembly 139 is preferably positioned at the base of the fixed shaft 122 and runs in an oil bath 210 within a sump in the foundation 126. The lower bearing race 211 is mounted on the outer periphery of the inner fixed shaft 123 by an adjustable support bracket assembly 212 substantially identical to the support bracket assembly 201 but adapted to be mounted on the outer rather than the inner surface of the supporting shaft. Positioning of the lower race 211 may be accomplished by the adjustable bracket 212, which is accessible through the oil sump 210.

The upper race 213 of the lower bearing 139 is mounted on the inner periphery of the rotatable shaft 122, adjacent the bottom thereof, by a second adjustable mounting bracket assembly 201 mounted in inverse relation to the mounting bracket 201 supporting the race 200 of bearing 138. Access to the top bearing race 213, and its supporting bracket 201 is through the access openings 127 which, as shown in FIG. 14, may be closed by the movable door assembly 214.

Preferably, the bearing races of both the upper and lower turbine bearings are fabricated in arcuate sections which are mounted in position and welded together, with the welded joint being subsequently ground to provide a continuous smooth race for the balls 206. This enables assembly of the respective races, or sections thereof, as necessary, through the access openings 127, with the welded joints, indicated generally at 216 in FIG. 5, being accomplished in the space between the concentric shafts 122 and 123.

Figure 25:
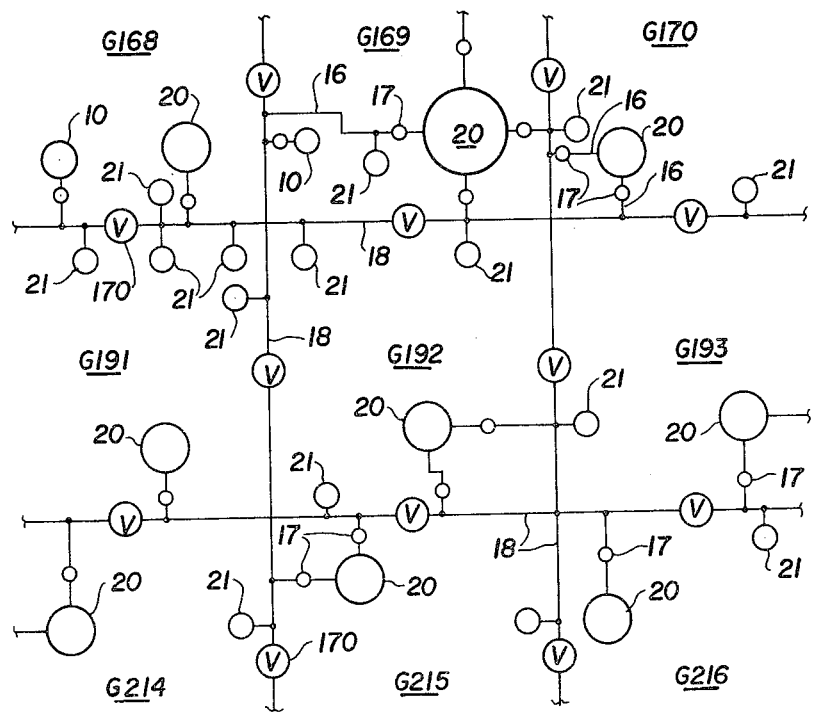
FIG. 25 is a schematic layout plan of a portion of a multiple grid system and illustrating the main isolation cut-off valves and typical modules encompassed within the grids.

Referring now to FIG. 25, a section of a national grid system is schematically illustrated to indicate the isolation cut-off valves within the over-all system, and the manner in which these valves are located to isolate sections of the grid in which trouble may develop. Also illustrated schematically on FIG. 25 is the manner in which the individual small or large modules such as those illustrated in greater detail in FIGS. 1 and 2 are tied into the larger regional, national or continental grid system whereby excess air from such a module may flow, via the grid system plumbing, to adjacent modules, or whereby air may be drawn from adjacent modules in times of insufficient air pressure at a particular module. Preferably, two-way meters are connected in the grid lines at the extremities of grid sections such as Section G 192 to measure the flow of air where needed.

As shown in FIG. 21, each module is connected to a pipe 18 of the grid system through a pipe 16 having connected therein a two-way meter assembly 17 for measuring the flow both from the module to the grid and from the grid into the module. The meter assembly consists of a pair of automated cut-off valve assemblies 163 located in the line 16 at each end of the flow measuring system. The pipe 16 adjacent each valve 163 is connected in a T-joint, with the open ends of the T being connected by parallel pipe sections 164, 165. Connected in the pipe section 165 is a one-way check valve 166 permitting flow from the module to the grid pipe only, through a flow meter 167 which measures the quantity of air flowing into the grid. Check valve 166 is spring biased to require a substantial predetermined pressure differential between the pressure in the module and that in the grid to thereby assure, particularly for smaller modules, an ample reserve supply of air by preventing the larger grid from drawing air from these smaller modules down below a required minimum operation level.

A second one-way check valve 168 is connected in the branch line 164 to permit flow only in the direction from the main grid piping into the module in question. Preferably, check valve 168 is also spring loaded, with the spring loading being relatively small, functioning primarily to assure against reverse flow through a second meter 169 connected in branch pipe 164 to measure the flow of air from the grid into the module. It is believed apparent that, by integrating the readings from meters 167 and 169, the net air flow from or to a module for any given time period may be determined.

FIG. 22 illustrates schematically the operation of the automated grid isolating shut-off valves 170. These isolation valves are connected in each grid line 18 between the points interconnection with grid lines running in the transverse direction as shown in FIG. 25. The respective valves 170 are located in manholes 171 and are actuated, through a suitable gear drive train 172 by a motor 173 which preferably is an air-actuated motor.

Actuation of the motor 173 is controlled by a three position, four-way closed-center slave valve 174. A spring biased damper assembly 175 mounted in the grid pipe 18 adjacent the valve 170 has a cam surface bearing upon one end of a spring-biased push rod assembly 176 extending outwardly through the side wall of the pipe 18 in position to engage an actuating rod for valve 174. The spring biasing pressure on rod 176 is such that a predetermined minimum flow rate of air through pipe 18, in either direction, will be required to tilt the damper and cause the cam to press the push rod upward. Thus, in the event of a line break, on either side of the particular valve 170, a sudden increase in flow rate through the pipe will push the rod 176 upward to move the valve 174 into position to drive motor 173 in a direction to close the valve 170. At the same time, a detent on the valve actuating rod 176 engages a switch 177 which, through normal electrical circuits, (not shown) transmits a signal to a control panel in the manhole and simultaneously to a regional and a national monitoring center. This enables immediate identification of trouble spots and enables immediate dispatch of maintenance personnel from each adjacent region in the grid serviced by the line in question.

Main line pressure is supplied to a pipe 177 through a pair of cut-off valves 177 and check valves 178 connected one each in line 18 on each side of the valve 170. A pressure reducer 180 in line 177 reduces the main line pressure to that required to operate the motor, and directs the reduced air pressure into a T-joint which directs the air through a conduit 181 through a flow control regulating orifice 182 to valve 174, and to a three position manual pilot valve 183. From valve 183, air may be directed, depending upon the position of the valve, to a pneumatic operating cylinder 184 through conduit 185 to shift the valve upward to direct air to motor 173 to drive the valve 170 to the closed position, or alternatively to direct air through line 186 to the operating cylinder 187 to shift the valve to the position to drive motor 173 to move the valve to the open position. In the third, or null position, of valve 183, air in the lines 185 and 186 are vented to atmosphere.

As shown in FIG. 23, at all low points in the transmission and storage pipe system, condensation drains are provided. These condensation drains include an isolation valve 188 in a line from the bottom of the pipe, for example, the main grid pipe 18, leading to a collection chamber 189. A conventional ball float valve is mounted in the collection chamber 189 and operates, when the condensation reaches a predetermined level, to permit main line pressure to blow the condensate, through a check valve 190 and drain line 191, to a condensate storage tank 192.

Due to the large diameter and heavy wall thickness of the main grid piping, conventional expansion loops may not be deemed practical. However, to accommodate inevitable expansion and contraction of the pipe, O-rings sealed sliding expansion joints are provided at spaced intervals, as required. These expansion joints, illustrated in FIG. 24, comprise mating male and female bolted welding flanges 193, 194 respectively, with spring loaded bolt connections therebetween, welded one to each end of the adjacent pipe sections 18.

The spring loading is provided by opposed springs 195 retained by bolts 196 through outwardly projecting annular flanges. A plurality of O-ring seals 198 are provided within the telescoping overlap portion of the respective well flanges 193, 194. To prevent foreign material from interfering with the telescoping action of the expansion joint, an annular gasket in the form of a soft rubber hose is positioned between the overlying end of well flange 193 and the outwardly projecting bolt flange portion of the element 194.

While I have disclosed and described preferred embodiments of my invention, I wish it understood that I do not intend to be restricted solely thereto, but rather that I intend to include all embodiments thereof which would be apparent to one skilled in the art and which come within the spirit and scope of my invention.

What is claimed is:

1. For use in an energy collection, storage, and distribution system in which compressed air is employed as a medium for storage of energy and employed to drive generators for generating electricity, a wind turbine operable to drive air compressor means and comprising, a base, a fixed central vertical column projecting upwardly from said base, said vertical column being tubular in form and of sufficient diameter to permit maintenance personnel to ascend and descend the column during operation of the turbine, a turbine blade support frame, bearing means journaling said support frame for rotation about the vertical axis of said column, a plurality of elongated, vertically extending turbine blades mounted on said support frame at spaced intervals therearound, said blades each having a concave and a convex surface and being mounted on said support frame with their vertical edges disposed in generally radial planes and with their concave surfaces facing in the same direction around said vertical axis, cooperating guide and track means on said base and said support frame at the bottom portion thereof supporting the outer periphery of said support frame, brake means on said base and operable to engage said support frame to resist rotation thereof, and guy means supporting the top of said central column against lateral movement under wind loading.

2. The compressor as defined in claim 1 further comprising access openings in said central column adjacent said bearing means providing access to said bearing means for maintenance from the interior of said column, and ladder means mounted within said central column.

3. The turbine as defined in claim 2 wherein said support frame comprises a tubular hub shaft telescopingly received over said column, said bearing means including antifriction bearings adjacent the top and the bottom of said tubular hub shaft and disposed between said hub shaft and said column, said hub shaft including a portion projecting downwardly below said turbine blades, and drive means on said downwardly projecting portion for driving air compressor means to supply compressed air for use in the energy collection system.

4. The wind turbine as defined in claim 3 further comprising air compressor means operatively connected to said hub shaft, and control means operable in response to air pressure produced by said air compressor means automatically actuating said brakes in response to excess air pressure.

5. For use in an energy collecting, storage and distribution system in which compressed air is employed as a medium for storage of energy and employed to drive generators for generating electricity, a wind turbine driven air compressor station comprising, in combination, a base, a central vertical tubular column projecting upwardly from said base, a turbine blade support frame mounted for rotation about the vertical axis of said central column, a plurality of elongaged vertically extending turbine blades mounted on said support frame at spaced intervals therearound and being disposed in position to be driven by wind to rotate said support frame about said central column, said support frame including an elongated tubular hub shaft journaled for rotation about the axis of said column and projecting downwardly below said turbine blades, air compressor means drivingly connected to said tubular shaft, said compressor means including a plurality of separate compressor stages, pressure sensing means for sensing the discharge pressure of each separate compressor stage and control means responsive to said pressure sensing means and operatively innerconnecting said compressor stages for automatically delivering low, intermediate or high pressure air at inversely varying flow rates for use in the energy collecting, storing and distributing system and in response to the pressure in the system, and brake means responsive to the air pressure in the system for limiting rotation speed of said turbine support frame.

6. The wind turbine driven air compressor station as defined in claim 5 further comprising cooperating guide and track means on said base and said support frame at the lower end thereof supporting the outer periphery of said support frame, and guy means supporting the top of said vertical central column.

* * * * *

UNITED STATES PATENT AND TRADEMARK OFFICE
CERTIFICATE OF CORRECTION

PATENT NO. : 4,167,372
DATED : September 11, 1979
INVENTOR(S) : Louis E. Tackett It is certified that error appears in the above-identified patent and that said Letters Patent are hereby corrected as shown below:

Figure 3, the flow direction of check valve 92 should be reversed.

Figure 10, the flow direction of check valves 64 and 68 should be reversed.

Figure 12, reference number "30" should be -- 130 --.

Column 4, line 2, "12" should be -- 11 --.

Column 10, line 17, "84" should be -- 48 --.
line 59, after "only", "in" should be -- for --.

Column 12, line 67, "brake" should be -- bracket --.

Column 15, line 54, after "points" insert -- of --.

Column 16, line 59, "well" should be -- weld --;
line 63, "well" should be -- weld --.

Column 17, line 31, "compressor" should be -- wind turbine --.

Signed and Sealed this

First Day of April 1980

[SEAL]

Attest:

SIDNEY A. DIAMOND

*Attesting Officer*   *Commissioner of Patents and Trademarks*